G. F. MAINER.
CABLE POTHEAD.
APPLICATION FILED MAR. 20, 1916.

1,229,995.

Patented June 12, 1917.

WITNESSES:
Charles Rickles
B. W. Dooline

INVENTOR
George F. Mainer,
BY Strong & Townsend
ATTORNEYS

UNITED STATES PATENT OFFICE.

GEORGE F. MAINER, OF SAN FRANCISCO, CALIFORNIA.

CABLE-POTHEAD.

1,229,995.  Specification of Letters Patent.  Patented June 12, 1917.

Application filed March 20, 1916. Serial No. 85,344.

*To all whom it may concern:*

Be it known that I, GEORGE F. MAINER, a citizen of the United States, residing at the city and county of San Francisco and State of California, have invented a new and useful Improvement in Cable-Potheads, of which the following is a specification.

This invention relates to a cable pot-head or terminal joint and union for cables.

It is an object of the present invention to provide a simple, cheaply manufactured form of cable pot-head to be used in connection with cable boxes on poles or in buildings which may be applied without a wipe joint and which will entirely inclose, protect and prevent admission of moisture at the point where the distributing wires are spliced onto the main cable. Further objects will hereinafter appear.

The invention consists of the parts and the construction and combination of parts as hereinafter more fully described and claimed, having reference to the accompanying drawings, in which—

Figure 1:
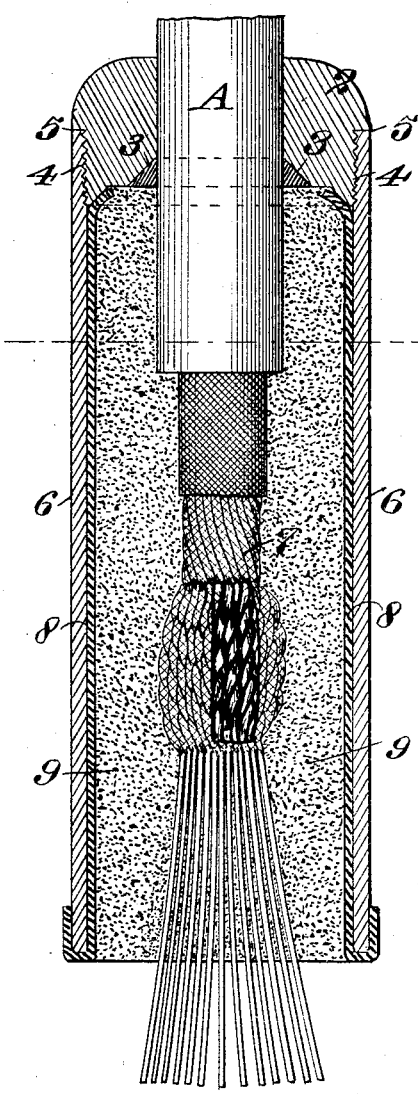
Figure 1 is a longitudinal section through the pot-head.
Figure 2:
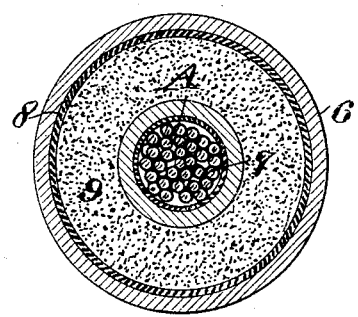
Fig. 2 is a cross section of same.

Referring to the drawings in detail, A represents a lead-covered cable and 2 a thick metal sleeve or collar surrounding same. This collar is provided with an annular V-shaped groove 3, at one end, a threaded section 4 and an annular shoulder 5. The metal collar is adapted to snugly fit the cable and be secured thereto by filling the annular groove 3 with solder.

6 represents a tube threaded at one end and adapted to be screwed onto the collar. The tube 6 is of sufficient length to entirely inclose the cable end, and particularly the splices formed between the distributing wires and the cable. The tube is preferably lined with a paper sleeve 8 and the space between the paper lining 8 and the main cable, with attached or connected distributing wires 7, is filled with an insulating compound, indicated at 9.

The device as a whole is particularly adapted for use in connection with cable boxes on poles or in buildings, and is provided for the purpose of protecting the cable end and particularly the splicing connections formed between the distributing wires and the cable against the entrance of moisture.

In practice, the end of the cable that is to be protected is first uncovered by cutting off a section of the lead sheathing covering the cable. This exposes the several layers or strands of wires carried by the cable. The metal sleeve 2 is then slipped over the cable end and soldered to the lead sheeting, indicated at 3. The metal tube 6 is then slipped over the ends of the several distributing wires 7, which are now spliced to the individual strands of the cable. The tube 6 is then pulled back and screwed onto the metal sleeve and the insulating compound is then finally poured into the tube to fill the space between the paper lining 8 and the individual wires 7 and the cable end. The individual wires are thus not only insulated from each other but become so embedded in the insulating compound that no moisture can possibly enter and form a short circuit between the wires.

The chief invention lies in the use of the collar 2 with a soldering joint 3. This construction positively eliminates the necessity of a wipe joint and is so simple that it may be applied by any lineman without resorting to the necessity, as heretofore has been the practice, of employing skilled labor for this purpose only.

The pot-head as a whole is cheaply manufactured, positively prevents the admission of moisture to the cable end or distributing wires 7 and can, furthermore, be more quickly and easily applied than other devices now in common use.

The paper lining 8 serves to separate the insulating compound from sleeve 6, so as to permit salvage of the sleeve. By cutting off the cable below the pot head and heating collar 2 so as to melt the solder, the entire contents of the sleeve may be readily removed. Without the paper lining the insulating compound would adhere to the sleeve interior.

The materials and finish of the several parts of the device are such as the experience and judgment of the manufacturer may dictate.

I wish it understood that various changes in form, proportions and details of construction may be resorted to within the scope of the appended claims, and that I do not wish to limit myself to the specific design and construction here shown.

Having thus described my invention, what

I claim and desire to secure by Letters Patent is—

1. In combination with a metal covered cable, a relatively thick collar having a bore to receive the cable so that the collar will be held against lateral movement by the length of the walls formed by the bore, said collar being formed with a countersunk groove which extends into the body of the collar, a sleeve threaded over the collar, a paper lining in the sleeve, solder in the groove engaging the cable, and insulating compound in the sleeve and engaged with the lining so as to be held by the latter out of contact with the sleeve.

2. In a cable pot head, a collar having a bore to receive the cable and having a solder-receiving groove in its inner end extending into the bore, solder in the groove engaging the cable, a sleeve threaded over the collar, a filler in the sleeve, and a lining between the sleeve and filler to allow removal of the sleeve and filler upon melting of the solder.

In testimony whereof I have hereunto set my hand in the presence of two subscribing witnesses.

GEORGE F. MAINER.

Witnesses:
JOHN H. HERRING,
W. W. HEALEY.